United States Patent
Tang et al.

(10) Patent No.: US 12,511,796 B2
(45) Date of Patent: Dec. 30, 2025

(54) REMOTE COLLABORATION METHOD, REMOTE DEVICE AND STORAGE MEDIUM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hai-Ping Tang, Shenzhen (CN); Cheng-Ching Chien, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 174 days.

(21) Appl. No.: 18/232,850

(22) Filed: Aug. 11, 2023

(65) Prior Publication Data

US 2023/0386094 A1    Nov. 30, 2023

(30) Foreign Application Priority Data

Apr. 11, 2023   (CN) .......................... 202310417583.7

(51) Int. Cl.
| | | |
|---|---|---|
| *G09G 5/32* | (2006.01) | |
| *G06F 3/14* | (2006.01) | |
| *G06T 7/70* | (2017.01) | |
| *G06T 11/00* | (2006.01) | |

(52) U.S. Cl.
CPC ................ *G06T 11/00* (2013.01); *G06F 3/14* (2013.01); *G06T 7/70* (2017.01); *G06T 2207/20104* (2013.01)

(58) Field of Classification Search
CPC .................... G06T 2219/004; G06T 2219/024
USPC ......................................................... 345/633
See application file for complete search history.

(56) References Cited

U.S. PATENT DOCUMENTS

| | | | |
|---|---|---|---|
| 9,071,709 B2 * | 6/2015 | Wither ............... | H04N 1/00323 |
| 10,484,824 B1 * | 11/2019 | Gaeta ..................... | H04B 1/385 |
| 12,243,268 B2 * | 3/2025 | Bai ........................ | H04N 5/265 |
| 2023/0251809 A1 * | 8/2023 | Singh ..................... | G06F 9/543 |
| | | | 345/633 |

FOREIGN PATENT DOCUMENTS

TW         202220438         5/2022

* cited by examiner

*Primary Examiner* — Samantha (Yuehan) Wang
(74) *Attorney, Agent, or Firm* — ScienBiziP, P.C.

(57) ABSTRACT

A remote collaboration method applied to a remote device is provided. In the method, the remote device receives a first image transmitted by a wearable device and determines a reference area based on the first image. The remote device further determines a position of a target object relative to the reference area and generates the indication information according to the position of the target object relative to the reference area and transmits the indication information to the wearable device. The method can provide a user with the indication information of the position of the target object in the eyesight through remote collaboration between the remote device and the wearable device, thereby improving the efficiency and accuracy of determining the position of the target object.

11 Claims, 5 Drawing Sheets

REMOTE COLLABORATION METHOD, REMOTE DEVICE AND STORAGE MEDIUM

FIELD

The present disclosure relates to a field of collaboration among multiple device, in particular to a remote collaboration method, a remote device, and a storage medium.

BACKGROUND

Due to limitations of hardware, pictures seen by a user through a display device of a wearable device can be smaller than pictures taken by a camera device of the wearable device, so that a visual range of the user when using the wearable device (such as an augmented reality device) is very limited, and a position of a target object that the user wants to pay attention to cannot be quickly and accurately obtained.

DETAILED DESCRIPTION

Figure 1:
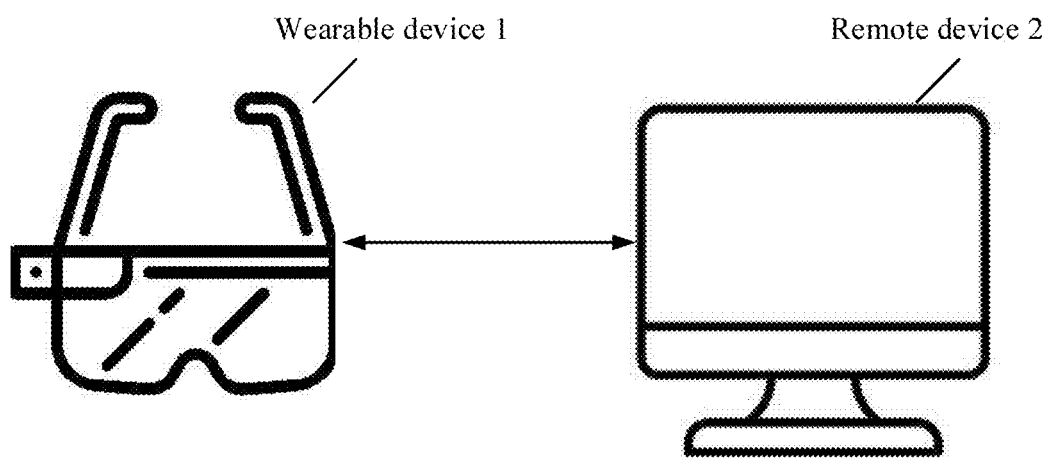
FIG. 1 is an application scenario diagram of a remote collaboration method provided by an embodiment of the present disclosure.

Plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have their common meanings as construed by those of ordinary skills in the art to which the present disclosure pertains. The terms "first", "second" and the like used in the embodiments of the present disclosure do not represent any order, quantity, or importance, but are merely used to distinguish between different components. The terms "include", "contain" or the like mean that elements or articles appearing before such terms may cover elements or articles listed after the words and their equivalents without excluding other elements or articles. The terms "connect", "link" or the like are not limited to physical or mechanical connection, but may include electrical connections, whether direct or indirect.

In at least one embodiment, due to limitations of hardware, pictures seen by a user through a display device of a wearable device can be smaller than pictures taken by a camera device of the wearable device, so that a visual range of the user when using the wearable device (such as an augmented reality device) is very limited, and a position of a target object that the user wants to pay attention to cannot be quickly and accurately obtained.

In order to solve the above problems, an embodiment of the present disclosure provides a remote collaboration method, which can help a user of the wearable device to find the target object quickly and accurately according to an indication information. The method can improve the efficiency and accuracy of determining the position of the target object by establishing a remote collaboration between a remote device and the wearable device, using the remote device to generate the indication information of the position of the target object through the established remote collaboration, and transmitting the indication information back to the wearable device. The remote collaboration method provided by the present disclosure in the following paragraphs combined with the application scenario diagram.

FIG. 1 is an application scenario diagram of a remote collaboration method provided in one embodiment of the present disclosure. As shown in FIG. 1, the wearable device 1 communicates with the remote device 2, thereby enabling data interaction between the wearable device 1 and the remote device 2. For example, the wearable device 1 transmits the captured image to the remote device 2, and the remote device 2 receives the image and generates indication information for indicating a target object based on the received image, the target object can be an object in the image that the user needs to pay attention to, and the remote device 2 transmits the indication information to the wearable device 1. The wearable device 1 receives and displays the indication message. Detailed description will be provided below by combining with a flowchart of the remote collaboration method.

In at least one embodiment, the wearable device 1 may include an augmented reality (AR) device, such as AR glass, AR helmet, and the like. The remote device 2 may be a computer, a server, a laptop, and so on.

In at least one embodiment of the present disclosure, the remote collaboration method can apply in a field of quality inspection. When a primary quality inspector conducts a quality inspection on a large device, it is generally not possible to quickly find a target object (e.g., a target component) that needs to be pay attention to, due to the unfamiliarity with the construction of the large device. Then the primary quality inspector gets help from an expert quality inspector to quickly find the target object by wearing the wearable device. The wearable device obtains a first image and transmits the first image to a remote device used by the expert quality inspector. The expert quality inspector can quickly determine the position of the target object in the first image through the remote device, and the remote device generates the indication information used for indicating the position of the target object and transmits the indication information back to the wearable device after responding to a selection operation of the expert quality inspector. The wearable device displays the indication information, so that the primary quality inspectors can quickly perform quality inspection on the target object according to the indication information, which can improve the efficiency and accuracy of quality inspection of the large device.

Figure 2:
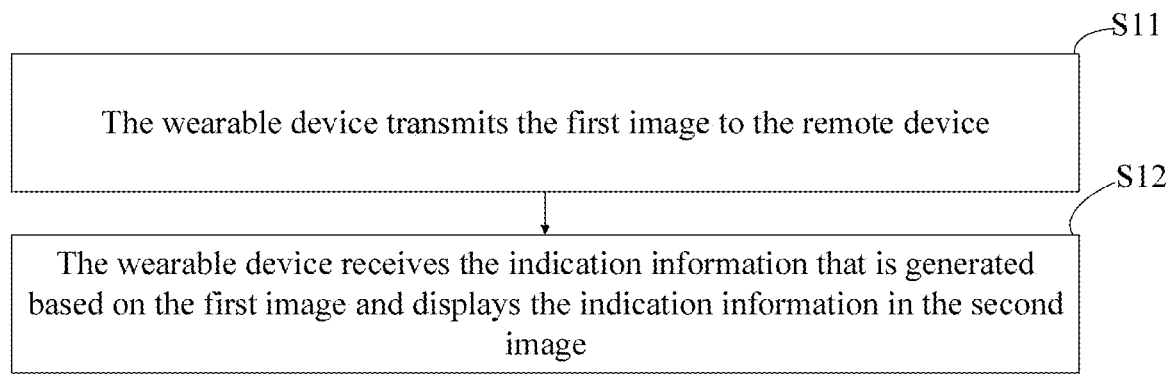
FIG. 2 is a flowchart of a remote collaboration method provided by an embodiment of the present disclosure.

FIG. 2 is a flowchart of a remote collaboration method provided by an embodiment of the present disclosure. In one embodiment, the method can be performed by using a wearable device (e.g., the wearable device 1 shown in FIG. 1). The remote collaboration functionality provided by the method of the present disclosure embodiment may be integrated on the wearable device, or may be run in the form of a Software Development Kit (SDK).

As shown in FIG. 2, the method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S11.

In block S11, the wearable device transmits the first image to the remote device.

In one embodiment, the first image includes an image of a realistic scene captured by the wearable device. The wearable device includes an image capturing device for shooting the first image. For example, the wearable device may include an AR device, such as AR glasses, that captures the first image using the image capturing device of the AR device.

Figure 3:
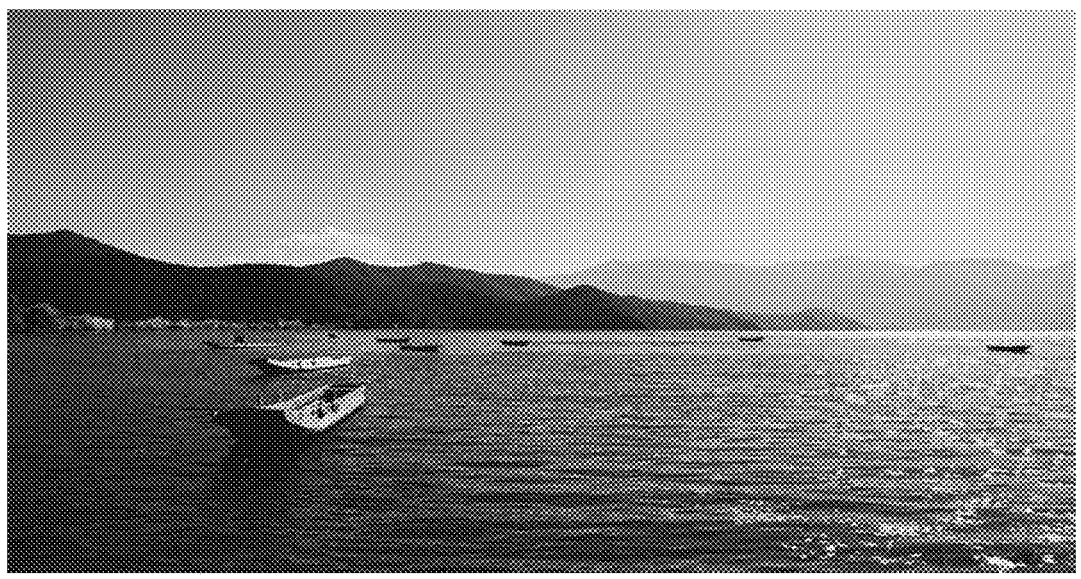
FIG. 3 is a schematic diagram of a first image provided by an embodiment of the present disclosure.

For example, FIG. 3 is a schematic diagram of a first image provided by one embodiment of the present disclosure. The first image contains several objects. The objects are actual, for example, the object can be a vessel of FIG. 3.

In one embodiment, the wearable device processes the first image. For example, when the wearable device is the AR device, the AR generates an augmented reality image by processing the first image.

In particular, the AR device generates the augmented reality image based on the first image using commonly used AR technologies including, but not limited to, Monitor-based technology, Optical See-through technology, and the like. The basic principle of AR technology includes the fusion of pre-generated virtual objects or scenes into real-estate images to obtain augmented reality images.

In one embodiment, the wearable device displays the augmented reality image using a display device, such as a display screen, such that a user can see the augmented reality image through the display device. Due to hardware limitations, the augmented reality image seen by the user through the display device is smaller than the first image taken by the camera device of the wearable device.

Figure 4:
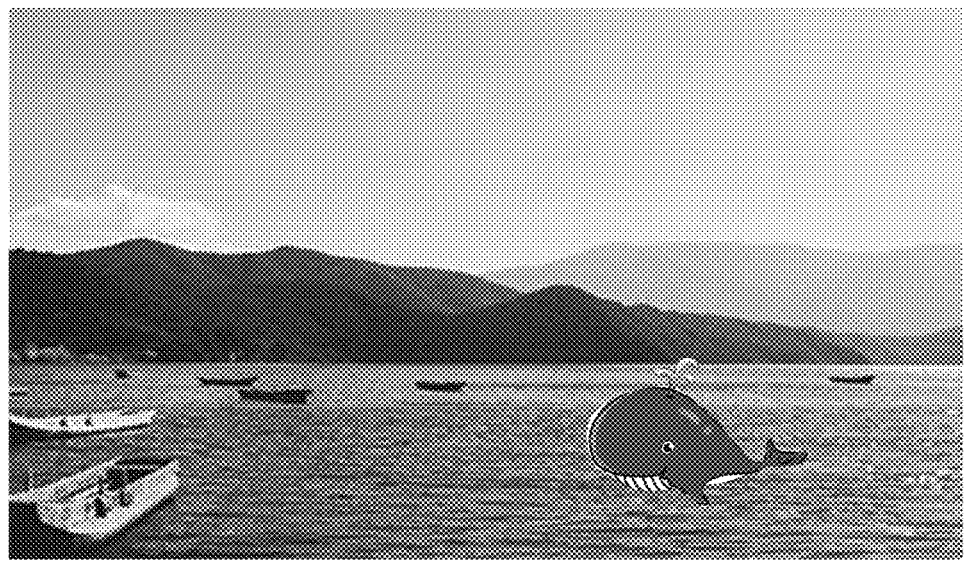
FIG. 4 is a schematic diagram of a second image provided by an embodiment of the present disclosure.

Thus, the wearable device sets the image that the user sees through the display device as a second image. A size of the second image will generally be smaller than a size of the first image, and the second image may include both real objects and dummy objects. For example, FIG. 4 shows a schematic diagram of the second image provided for one embodiment of the present disclosure, a whale in FIG. 4 is a dummy object.

In one embodiment, after the wearable device transmits the first image to the remote device, another user of the remote device may determine a target object that needs to be viewed based on the first image. Since the first image includes the target object, the second image does not include the target object. That is, the target object is not rendered in the second image currently displayed by the wearable device. In order to assist a user wearing the wearable device to determine the position of the target object, such that the user wearing the wearable device can focus a viewing angle on the target object as soon as possible. The wearable device transmits the first image to a communicatively connected remote device, and the remote device can be used to assist in generating the indication information of the position of the target object, thereby enabling the user wearing the wearable device to adjust the viewing angle according to the indication information. So that the user of the wearable device can see the target object through the wearable device.

In block S12, the wearable device receives the indication information that is generated based on the first image and displays the indication information in the second image.

In one embodiment, the second image includes the augmented reality image generated based on the first image, the indication information being used to indicate a position of a target object.

In one embodiment, in order to display the indication information to a user for viewing so that the user can confirm the position of the target object according to the indication information, the wearable device displays the indication information in the second image which being displayed by the display device. For example, the indication information can be one of graph (for example, arrow, etc.), label, text, numbers or a combination of the graph, label, text, numbers.

Figure 5:
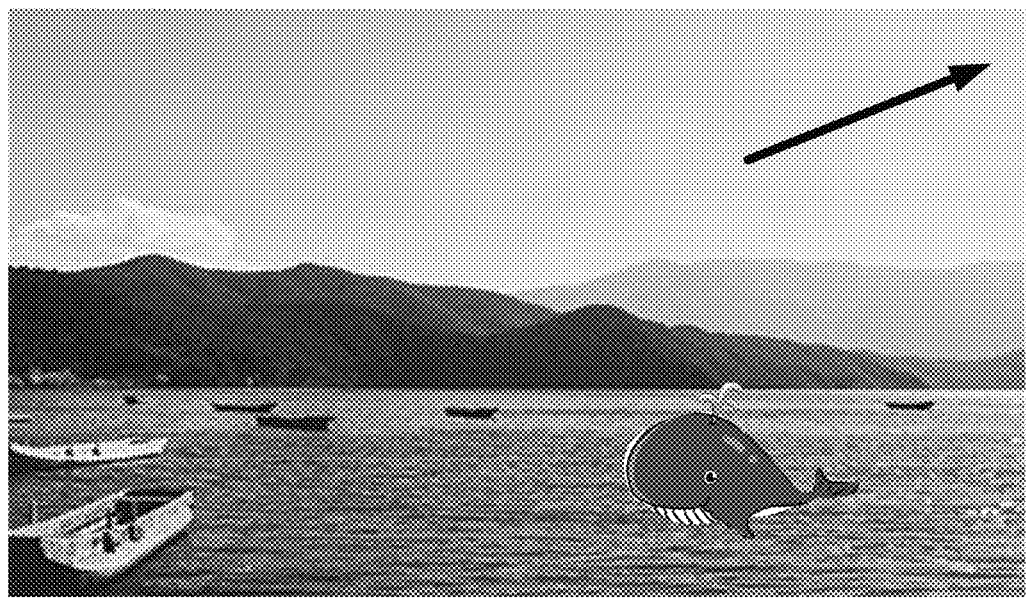
FIG. 5 is a schematic diagram of indication information provided for one embodiment of the present disclosure.

For example, FIG. 5 is a schematic diagram of the indication information provided for one embodiment of the present disclosure. The arrow represents the indication information for indicating the position of the target object that is not in the second image.

In one embodiment, the wearable device extracts each frame of a video which is recorded by a camera device of the wearable device and sets the extracted frame as the first image. The wearable device transmits the first image of each frame to the remote device by transmitting the video to the remote device in time sequence. The wearable device receives the indication information generated by the remote device based on the first image of each frame, and displays the indication information in the second image corresponding to the first image of each frame, thereby enabling the user to obtain the updated indication information of the position of the target object in time when the user moves his/her eyes.

Figure 6:
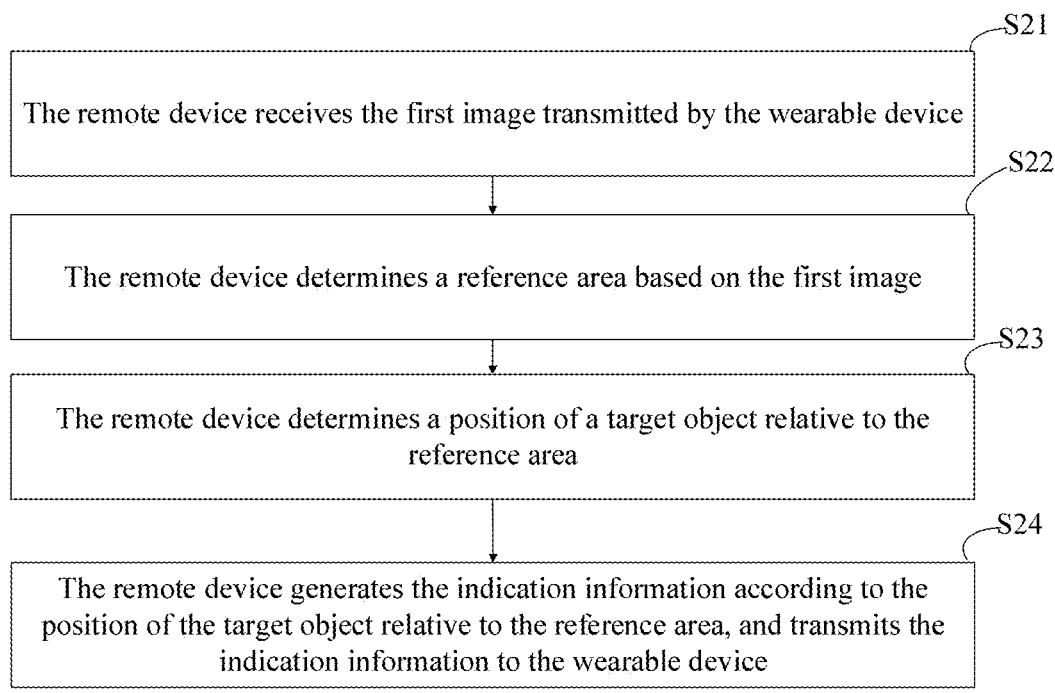
FIG. 6 is another flowchart of a remote collaboration method provided by an embodiment of the present disclosure.

FIG. 6 is a flowchart of a remote collaboration method provided by another embodiment of the present disclosure. In one embodiment, the method can be performed by using a wearable device (e.g., the remote device 2 shown in FIG. 1). The remote collaboration functionality provided by the method of the present disclosure embodiment may be integrated on the wearable device, or may be run in the form of a Software Development Kit (SDK).

As shown in FIG. 6, the method is provided by way of example, as there are a variety of ways to carry out the method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S21.

In block S21, the remote device receives the first image transmitted by the wearable device.

In at least one embodiment, the remote device is communicatively connected to the wearable device to receive the first image transmitted by the wearable device. The first image includes an image of a real scene taken by the wearable device, such as that shown in FIG. 3.

In block S22, the remote device determines a reference area based on the first image.

In one embodiment, the remote device receives the second image transmitted by the wearable device and determines the reference area according to a position of the second image in the first image. The wearable device generates the augmented reality image based on the first image and obtains the second image based on the augmented reality image and sends the second image to the wearable device.

In one embodiment, the second image (such as that shown in FIG. 4) represents an image that a user can see in the display device of the wearable device. A size of the second image is smaller than a size of the first image, so that the position of the second image in the first image can be determined. In particular, methods for determining the position of a second image in the first image include, but are not limited to, a template matching algorithm that may determine an occupied area of the second image in the first image and set the occupied area as the reference area.

Figure 7:
FIG. 7 is a schematic diagram of a reference area provided for one embodiment of the present disclosure.

In one embodiment, the remote device labels the reference area in the first image. For example, FIG. 7 shows a schematic diagram of a reference area provided by an embodiment of the present disclosure, an area within a dashed rectangular frame is the reference area.

In other embodiments, in addition to the method of receiving the second image transmitted by the wearable device to determine the reference area. The remote device further obtains parameters used by the wearable device in generating the second image based on the first image, and display parameters of the display device of the wearable device. Then the remote device obtains a ratio of the second image to the first image and determines the reference area based on the ratio. For example, the remote device generates the second image based on an image with a proportion of ¾ of the center area of the first image. And an aspect ratio of the generated second image is equal to an aspect ratio of the first image, then the reference area corresponding to the second image is an area with a proportion of ¾ of the center area of the first image and the aspect ratio is equal to the aspect ratio of the first image.

In block S23, the remote device determines a position of a target object relative to the reference area.

In one embodiment, the remote device further identifies the target object in the first image using an image recognition algorithm and determines the position of the target object in the first image, or the remote device further determines the position of the target object in the first image in response to a selection operation of the target object by a user.

In one embodiment, the image recognition algorithm includes commonly used target detection algorithms, such as a pretrained convolution neural network-based target detection model. The remote device generates a bounding box for the target object after detecting the target object and labels the position of the target object. By using the image recognition algorithms can quickly determine the location of target objects without labor costs.

In one embodiment, the remote device may generate the bounding box corresponding to the target object after the expert quality inspector executing a selection operation of the target object by using an operating device such as a mouse. In response to the selected operation by the expert quality inspector, the accuracy of the position of the determined target object can be improved.

In one embodiment, the remote device determines whether the target object is located outside the reference area, and calculates a relative angle between the target object and the reference area in response that the target object is located outside the reference area, and determines the position of the target object relative to the reference area based on the relative angle.

In one embodiment, the remote device determines whether the target object is located outside the reference area by performing an image overlap area identification method to determine whether the image within the bounding box of the target object has an overlapping area with the image of the reference area, and determine that the target object is located outside the reference area when the image within the bounding box of the target object has no overlapping areas with the image of the reference area, or determine that the target object is located inside the reference area when the image within the bounding box of the target object has at least one overlapping area with the image of the reference area.

In one embodiment, as the size of the first image is greater than a size of the reference area corresponding to the second image, the target object may be located outside the reference area in the first image, and the user cannot see the target object or know the position of the target object.

Therefore, when the target object is located outside the reference area, the remote device determines the position of the target object relative to the reference area, thereby providing an indication of the position of the target object to the user (e.g., an expert quality inspector).

In one embodiment, the position of the target object relative to the reference area includes, but is not limited to, a relative angle of the target object to the reference area.

The remote device establishes a right-angle coordinate system by setting a center point of the reference area as an origin of the coordinate, and a transverse axis of the right-angle coordinate system is parallel to a long edge of the reference area, a longitudinal axis of the right-angle coordinate system is parallel to a short edge of the reference area. The remote device calculates the relative angle between the target object and the reference area based on the right-angle coordinate system. The remote device obtains a vector by connecting the origin of the coordinate with the center point of the bounding box of the target area, and obtains the relative angle by calculating the angle between the vector and the transverse axis or the longitudinal axis of the right-angle coordinate system.

In block S24, the remote device generates the indication information according to the position of the target object relative to the reference area, and transmits the indication information to the wearable device.

In one embodiment, as the target object is located inside the reference area, the user can directly see the target object in the screen corresponding to the reference area, the remote device generates the indication information of the position of the target object for the user. The indication information includes a graphic or text within the reference area for indicating a position of the target object. For example, the graphic may be an image of the bounding box of the target object, or an arrow pointing to the bounding box of the target object, and the text may be indicative text above the bounding box of the target object.

In one embodiment, as the target object is located outside the reference area, the indication information includes a graphic or text within the reference area that indicates the position of the target object, the text including the relative angle. For example, the graphic may be the relative angle calculated above, an image of the bounding box of the target object, or an arrow pointing to the target object.

In one embodiment, after the remote device generates the indication information based on the position of a target object relative to the reference area, and transmits the indication information to the wearable device, so that the user can see the indication information (e.g., the arrow in FIG. 5) by using the wearable device and quickly move the wearable device to see the target object based on the indication information.

In one embodiment, a remote collaboration method provided by the present disclosure includes transmitting the first image from the wearable device to the remote device, the remote device receives the first image, and determines a position of a target object relative to the reference area based on the first image, and generates the indication information based on the position of a target object relative to the reference area and transmits the indication information to the wearable device. The wearable device receives the indication information and displays the indication information in the second image.

In one embodiment, the remote collaboration method provided by the present disclosure utilizes the remote device to generate the indication information of the position of the target object through remote collaboration between the wearable device and the remote device, and transmits the indication information back to the wearable device, so that a user can see the indication information and find the target object quickly and accurately according to the indication information, thereby improving the efficiency and accuracy of determining the position of the target object.

The remote collaboration method of the present disclosure is described in detail in FIG. 2 and FIG. 6 above, and the structure of a remote device implementing the remote collaboration method is described below in conjunction with FIG. 8.

Figure 8:
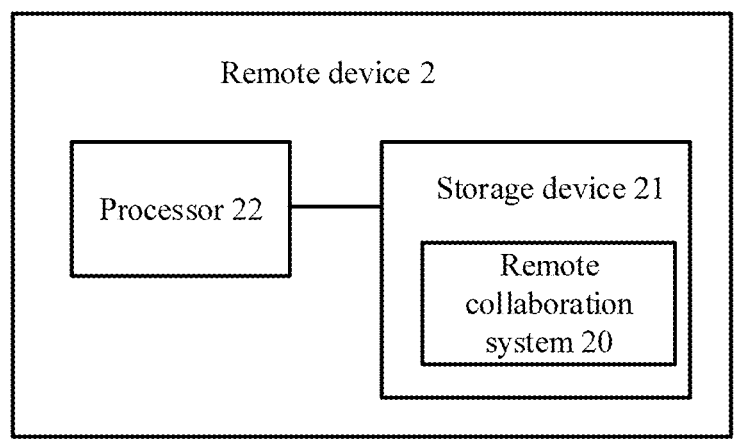
FIG. 8 is a schematic structural diagram of a remote device provided by an embodiment of the present disclosure.

FIG. 8 is a schematic structural diagram of a remote device provided by an embodiment of the present disclosure. In at least one embodiment, the remote device 1 includes a storage device 21, at least one processor 22. Those skilled in the art should understand that the structure of the electronic device shown in FIG. 8 does not constitute a limitation of the embodiment of the present disclosure, more or less other hardware or software, or a different arrangement of components.

In some embodiments, the remote device 2 includes a terminal capable of automatically performing numerical calculation and/or information processing according to preset or stored instructions, and its hardware includes but not limited to microprocessors, application-specific integrated circuits, programmable gate arrays, digital processors, and embedded devices, etc.

It should be noted that the remote device 2 is only an example, and other existing or future electronic products that can be adapted to the present disclosure should also be included in the scope of protection of this disclosure and are included here by reference.

In some embodiments, the storage device 21 is used to store program codes and various data. For example, the storage device 21 can be used to store a remote collaboration system 20 installed in the remote device 2 and realize high-speed and automatic program or data access during the operation of the remote device 2. The storage device 21 includes a read-only memory (Read-Only Memory, ROM), a programmable read-only memory (Programmable Read-Only Memory, PROM), an erasable programmable read-only memory (Erasable Programmable Read-Only Memory, EPROM), One-time Programmable Read-Only Memory (OTPROM), Electronically Erasable Programmable Read-Only Memory (EEPROM), Compact Disc Read-Only Memory (EEPROM), Only Memory, CD-ROM) or other optical disk storage, magnetic disk storage, tape storage, or any other computer-readable storage medium that can be used to carry or store data.

In some embodiments, the at least one processor 22 may be include an integrated circuit, for example, may be include a single packaged integrated circuit, or may be include multiple integrated circuits with the same function or different functions packaged, including one or more central processing units (Central Processing unit, CPU), microprocessors, digital processing chips, graphics processors, and various control chips. The at least one processor 22 is the control core (Control Unit) of the remote device 2, and uses various interfaces and lines to connect various components of the entire remote device 2, by running or executing programs stored in the storage device 21 or module, and call the data stored in the storage device 21 to execute various functions of the remote device 2 and process data, for example, to execute the function of remote collaboration method shown in FIG. 6.

In some embodiments, the remote collaboration system 20 operates in the remote device 2. The remote collaboration system 20 may include a plurality of functional modules composed of program code segments. The program code for each segment in the remote collaboration system 20 may be stored in the memory 21 of the remote device 2 and executed by at least one processor 22 to implement the functions of remote collaboration shown in FIG. 6.

In this embodiment, the remote collaboration system 20 may be divided into a plurality of functional modules according to the functions it performs. As used herein, a module refers to a series of computer program segments that are capable of being executed by at least one processor and capable of performing fixed functions, which are stored in memory.

Although not shown, the remote device 2 may also include a power supply (such as a battery) that supplies power to various components. The power supply may be logically connected with processor 22 through a power management device, thereby achieving functions such as managing charge, discharge, and power consumption management through a power management device. The power supply may also include one or more DC or AC power supplies, recharging devices, power failure test circuits, power converters or inverters, power status indicators and other arbitrary components. The remote device 2 can also include a variety of sensors, Bluetooth module, Wi-Fi module, etc., which is not described.

It is to be understood that the described embodiments are for illustrative purposes only and are not limited in the scope of the patent application by this structure.

The above-mentioned integrated unit in the form of a software functional module may be stored in a computer-readable storage medium. The software functional modules described above are stored in a storage medium and include instructions for causing a remote device (which may be a server, personal computer, etc.) or a processor to perform portions of the methods described in various embodiments of the present invention.

The memory 21 stores program code and the at least one processor 22 may call program code stored in the memory 21 to perform related functions. The program code stored in the memory 21 may be executed by the at least one processor 22 to implement the functions of the respective modules for the purpose of remote collaboration.

In several embodiments provided herein, the disclosed devices and method may be implemented in other ways. For example, the embodiments of the devices described above are merely illustrative, for example, the partitioning of the modules, which is merely a logical functional partition, may be implemented in a different way.

The modules described as separate components may or may not be physically separated, and the components shown as modules may or may not be physical units, i.e., may be in one place, or may be distributed over multiple network units. Some or all these modules may be selected to achieve the purpose of this embodiment according to actual needs.

In addition, the functional modules in various embodiments of the present disclosure may be integrated in one processing unit, or each unit may be physically present separately, or two or more units may be integrated in one unit. The integrated unit can be implemented in the form of hardware or a hardware plus software function module.

It will be apparent to those skilled in the art that the present disclosure is not limited to the details of the exemplary embodiments described above, and that the present disclosure can be implemented in other specific forms without departing from the spirit or essential features of the present disclosure. Accordingly, in all respects, the embodiments should be considered exemplary and non-limiting, and the scope of the present disclosure is defined by the appended claims rather than by the foregoing description and is therefore intended to encompass all variations falling within the meaning and scope of equivalents of the claims. No reference numerals in the claims shall be construed as limiting the claims to which they relate. Moreover, the word "includes" does not exclude other elements or that the singular does not exclude the plural. Multiple units or devices described in the device claims may also be implemented by one unit or device through software or hardware. First, second-class words are used to denote names and do not denote any order.

It should be noted that the above examples are merely illustrative of the technical scheme of the present disclosure and are not limiting, and although the present disclosure has been described in detail with reference to the above preferred embodiments, those skilled in the art will appreciate that modifications or equivalent substitutions may be made to the technical scheme of the present disclosure without departing from the spirit and scope of the technical scheme of the present disclosure.

What is claimed is:

1. A remote collaboration method using a remote device, the remote device is communicatively connected to a wearable device, the method comprising:
   receiving a first image transmitted by the wearable device;
   determining a reference area based on the first image;
   determining a position of a target object relative to the reference area, comprising:
   determining whether the target object is located outside the reference area; calculating a relative angle between the target object and the reference area in response that the target object is located outside the reference area; and determining the position of the target object relative to the reference area based on the relative angle;
   generating indication information according to the position of the target object relative to the reference area, wherein the indication information comprises: a graphic or text within the reference area for indicating the position of the target object, the text comprises the relative angle; and
   transmitting the indication information to the wearable device.

2. The remote collaboration method according to claim 1, wherein determining the reference area based on the first image comprises:
   receiving a second image transmitted by the wearable device, and the second image comprises an augmented reality image that is generated based on the first image; and
   determining the reference area according to a position of the second image in the first image.

3. The remote collaboration method according to claim 1, wherein the method further comprises:
   identifying the target object in the first image using an image recognition algorithm; and
   determining the position of the target object in the first image.

4. The remote collaboration method according to claim 1, wherein the method further comprises:
   in response to a selection operation of the target object by a user, determining the position of the target object in the first image.

5. A remote device comprising:
   a storage device;
   at least one processor; and
   the storage device storing one or more programs, which when executed by the at least one processor, cause the at least one processor to:
   receive a first image transmitted by a wearable device;
   determine a reference area based on the first image;
   determine a position of a target object relative to the reference area, comprising: determining whether the target object is located outside the reference area; calculating a relative angle between the target object and the reference area in response that the target object is located outside the reference area; and determining the position of the target object relative to the reference area based on the relative angle;
   generate indication information according to the position of the target object relative to the reference area, wherein the indication information comprises: a graphic or text within the reference area for indicating the position of the target object, the text comprises the relative angle; and
   transmit the indication information to the wearable device.

6. The remote device according to claim 5, wherein the at least one processor determines the reference area based on the first image by:
   receiving a second image transmitted by the wearable device, and the second image comprises an augmented reality image that is generated based on the first image; and
   determining the reference area according to a position of the second image in the first image.

7. The remote device according to claim 6, wherein the at least one processor further caused to:

identify the target object in the first image using an image recognition algorithm; and determine the position of the target object in the first image.

8. The remote device according to claim 6, wherein the at least one processor further caused to:

in response to a selection operation of the target object by a user, determine the position of the target object in the first image.

9. A non-transitory storage medium having instructions stored thereon, when the instructions are executed by a processor of a remote device, the processor is caused to perform a remote collaboration method, wherein the method comprises:

receiving a first image transmitted by a wearable device;

determining a reference area based on the first image;

determining a position of a target object relative to the reference area, comprising: determining whether the target object is located outside the reference area; calculating a relative angle between the target object and the reference area in response that the target object is located outside the reference area; and determining the position of the target object relative to the reference area based on the relative angle;

generating indication information according to the position of the target object relative to the reference area, wherein the indication information comprises: a graphic or text within the reference area for indicating the position of the target object, the text comprises the relative angle; and transmitting the indication information to the wearable device.

10. The non-transitory storage medium according to claim 9, wherein determining the reference area based on the first image comprises:

receiving a second image transmitted by the wearable device, and the second image comprises an augmented reality image that is generated based on the first image; and determining the reference area according to a position of the second image in the first image.

11. The non-transitory storage medium according to claim 9, wherein the method further comprises:

identifying the target object in the first image using an image recognition algorithm; and determining the position of the target object in the first image.

* * * * *